United States Patent
Chung et al.

(10) Patent No.: US 9,743,472 B2
(45) Date of Patent: Aug. 22, 2017

(54) ELECTRICAL LOAD DRIVING APPARATUS

(71) Applicant: City University of Hong Kong, Kowloon (HK)

(72) Inventors: Shu Hung Henry Chung, Mid-Levels (HK); Ruihong Zhang, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 586 days.

(21) Appl. No.: 13/836,337

(22) Filed: Mar. 15, 2013

(65) Prior Publication Data

US 2014/0265884 A1    Sep. 18, 2014

(51) Int. Cl.
*H05B 33/08* (2006.01)
*H01F 38/00* (2006.01)
*H01F 30/04* (2006.01)
*H02J 3/00* (2006.01)

(52) U.S. Cl.
CPC ......... *H05B 33/0821* (2013.01); *H01F 30/04* (2013.01); *H02J 3/00* (2013.01); *Y10T 307/25* (2015.04); *Y10T 307/297* (2015.04)

(58) Field of Classification Search
CPC ............... H05B 33/0821; Y10T 307/25; Y10T 307/484; Y10T 307/297
USPC ...... 315/185 R, 291, 219, 297, 317; 307/17; 323/361
See application file for complete search history.

(56) References Cited

U.S. PATENT DOCUMENTS

| | | | |
|---|---|---|---|
| 2007/0159006 A1* | 7/2007 | Lee | H02J 9/005 307/17 |
| 2008/0061708 A1* | 3/2008 | Wi | H05B 41/2822 315/277 |
| 2010/0079085 A1* | 4/2010 | Wendt | H05B 33/0815 315/294 |
| 2010/0237799 A1* | 9/2010 | Choi | H02M 3/285 315/294 |
| 2011/0260643 A1* | 10/2011 | Huang | G09G 3/3406 315/294 |
| 2013/0200801 A1* | 8/2013 | Fratti | H05B 33/0827 315/122 |
| 2015/0327338 A1* | 11/2015 | Hui | H05B 33/0827 323/317 |

* cited by examiner

*Primary Examiner* — Douglas W Owens
*Assistant Examiner* — Amy Yang
(74) *Attorney, Agent, or Firm* — Renner, Kenner, Greive, Bobak, Taylor & Weber Co. LPA

(57) ABSTRACT

An electrical load driving apparatus, comprising a current distribution apparatus having a power source arranged to deliver an input current into a plurality of branches such that the input current is distributed into a plurality of individual branch currents, wherein each of the plurality of branches includes an inductive arrangement arranged to form an inductive coupling with an associated inductive arrangement of at least one other associated branch, and a plurality of output loads connect to each of the associated branches of the current distribution apparatus.

26 Claims, 13 Drawing Sheets

ELECTRICAL LOAD DRIVING APPARATUS

TECHNICAL FIELD

The present invention relates to an electrical load driving apparatus, and particularly, although not exclusively, to a driving circuit for multiple LED strings.

BACKGROUND

Lighting apparatus is essential for daily lives of human beings, for the illumination in dark/low-light environment, or as a supplementary visual aid in varies situations such as repair and maintenance. Lighting apparatus is also essential components such as backlight module of a flat panel display, and signal indicators.

In the past, lighting apparatus are usually made with incandescent or fluorescent light bulbs/tubes. With recent advances in solid-state lighting technology, high brightness light emitting diodes (LEDs) have been widely adopted in various commercial, residential and industrial lighting applications, due to their high luminous efficacy and long life expectancy. An LED lamp consists of multiple LEDs connected in the form of strings with each string having several LEDs connected in series, so as to meet the output voltage and current specifications of the front-stage driver.

SUMMARY OF THE INVENTION

In accordance with a first aspect of the present invention, there is provided an electrical load driving apparatus, comprising a current distribution apparatus having a power source arranged to deliver an input current into a plurality of branches such that the input current is distributed into a plurality of individual branch currents; wherein each of the plurality of branches includes an inductive arrangement arranged to form an inductive coupling with an associated inductive arrangement of at least one other associated branch; and a plurality of output loads connect to each of the associated branches of the current distribution apparatus.

In an embodiment of the first aspect, the inductive arrangement of each branch comprises a first coil and a second coil.

In an embodiment of the first aspect, the first coil of each branch is inductively coupled with the second coil of an adjacent branch.

In an embodiment of the first aspect, the first coil of each branch and the second coil of an adjacent branch together defines a transformer unit.

In an embodiment of the first aspect, the number of transformer units equals the number of branches.

In an embodiment of the first aspect, the transformer units are connected in a daisy-chained manner.

In an embodiment of the first aspect, the first coils are primary coils of the transformer units and the second coils are secondary coils of the transformer units.

In an embodiment of the first aspect, the primary coil and the secondary coil of each transformer unit are disposed in adjacent branches.

In an embodiment of the first aspect, the primary coil of each transformer unit is disposed on the same branch with the secondary coil of an adjacent transformer unit.

In an embodiment of the first aspect, a summation of the individual branch current of each of the plurality of individual branches is substantially equal to the input current.

In an embodiment of the first aspect, the electrical load driving apparatus further comprises a plurality of isolation circuits operable to disconnect one or more of the associated output loads from one or more of the associated branches of the current distribution apparatus.

In an embodiment of the first aspect, the isolation circuit is connected between the associated output load and the associated branch of the current distribution apparatus.

In an embodiment of the first aspect, the electrical load driving apparatus further comprises a recycling circuit arranged to receive the individual branch current of the current distribution apparatus upon a disconnection of the associated output load from the associated branch of the current distribution apparatus.

In an embodiment of the first aspect, the recycling circuit connects to at least one branch of the current distribution apparatus, and is in electrical communication with the power source.

In an embodiment of the first aspect, the electrical load driving apparatus further comprises a plurality of diodes arranged to maintain an electrical connection between the recycling circuit with the associated branch upon a disconnection of the associated output load from the associated branch of the current distribution apparatus.

In an embodiment of the first aspect, the diode forms a connection between the recycling circuit and the associated branch of the current distribution apparatus.

In an embodiment of the first aspect, the electrical load driving apparatus further comprises a plurality of switching circuits connect between the power source and each of the associated branches of a plurality of input branches of the current distribution apparatus.

In an embodiment of the first aspect, the switching circuit comprises a first diode arranged to prevent current from flowing between individual input branch of the current distribution apparatus to an another individual branch; and a second diode arranged to maintain a current flow when a zero voltage is applied to the switching circuit.

In an embodiment of the first aspect, the electrical load driving apparatus further comprises a plurality of switching circuits connect between each of the associated output loads and each of the associated branches of the current distribution apparatus.

In an embodiment of the first aspect, the switching circuit comprises a plurality of diodes connected as a full-bridge rectifier.

In an embodiment of the first aspect, the power source is an alternating current source generated by connecting a direct current source to an input switching circuit.

In accordance with a second aspect of the present invention, there is provided an electrical load switching apparatus comprising a plurality of electrical loads connect in series; a plurality of switching circuits connected in parallel with each of the plurality of electrical loads; wherein the switching circuit are arranged to maintain a connection upon a disconnection of the associated electrical load.

In an embodiment of the second aspect, the switching circuit comprises a silicon controlled rectifier.

In an embodiment of the first aspect, the plurality of output loads is implemented with the electrical load switching apparatus of the second aspect.

In an embodiment of the first aspect, the plurality of output loads is a plurality of strings comprising a plurality of LEDs connected in series.

In an embodiment of the first aspect, whereupon one or more of the plurality of output loads is disconnected from each of the associated branches of the current distribution apparatus, the current distribution apparatus is arranged to absorb an electrical fluctuation caused by the disconnection within the electrical load driving apparatus.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1:
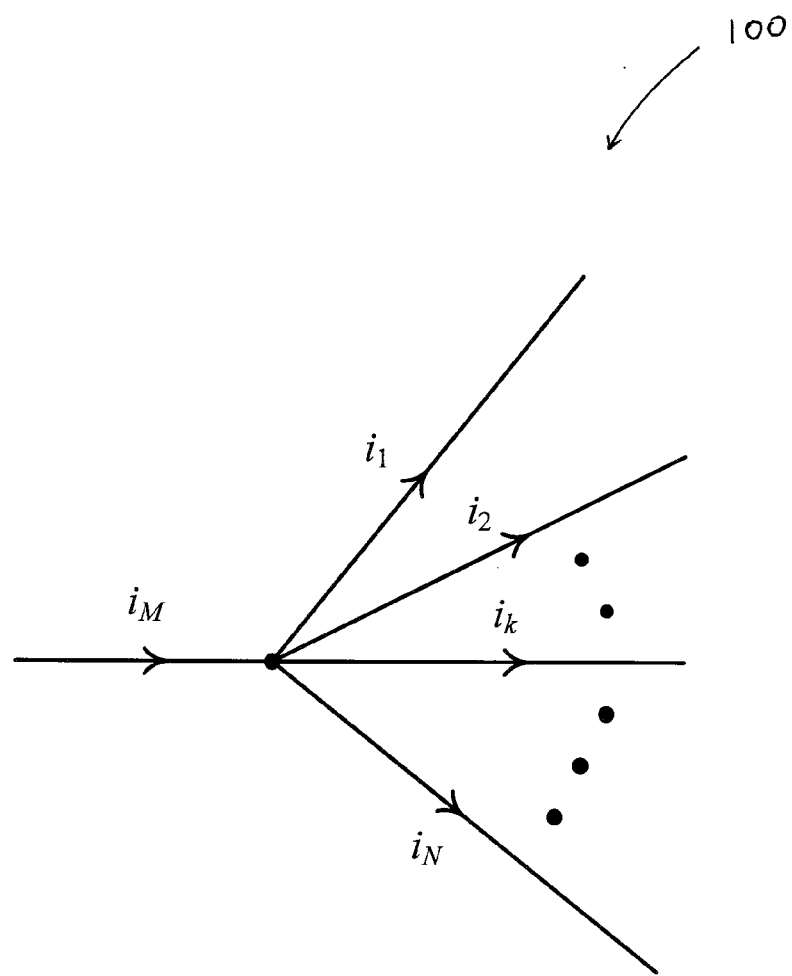
FIG. 1 is a diagram illustrating a simplified current distribution scheme.

The inventors have, through their own research, trials and experiments, devised that LEDs can be ideally driven by paralleling the strings. However, the string currents are practically unbalanced with this connection, due to the inconsistent nonlinear voltage-current characteristics among LEDs and the negative temperature coefficient of the LED forward voltage.

The passive current-balancing techniques are based on using resistors, coupled inductors, transformers, or capacitors to balance the string currents. In one example, a resistor is inserted in series with each string. The current-balancing function is achieved by the feedback mechanism between the string current and the positive temperature coefficient of the resistor. When the current through a string is increased, the power dissipation of the connected resistor will increase. Then, the resistor value will increase and the string current will reduce. However, this simple method is energy inefficient.

In another example, a series resonant converter with multiple output modules is used. Each output is used to drive two LED strings through a series resonant circuit and two diode-bridge rectifiers. One of the resonant inductors in each module is coupled to the resonant inductor of another module. The series resonant capacitors are used to perform the electrical isolation. In some examples, the current-balancing technique is based on the concept of "Huffman Tree". A transformer has its primary and secondary sides connected to two current paths requiring current balancing. Then, such same transformer structure is repeated for further current division. Thus, the primary transformer has the highest power rating, as its current is the highest. In some other examples, each LED string has a capacitor connected. The operating principle is based on the charge balance of the capacitors to balance the LED string currents. However, the advantages of the above-mentioned methods are counteracted by the following limitations:

When any LED string fails, the current balancing function might be lost.

The utilization of the LED string is low, as a half cycle of the current will flow through the string.

The effect of the magnetizing inductances of the coupling inductors and transformers is not taken into account.

The number of strings must be of even number.

The active current-balancing approach is based on using active devices to control the current through the LED strings. In some examples, the transistors are operated in linear region so as to compensate the difference between the dc-bus voltage and the LED string voltage. In two of the above examples, a current mirror is used to control the current. Using current regulators causes some challenges on the thermal considerations, a feedback control for adjusting the dc-bus voltage with a switching-mode converter is proposed in one example. In another example, each string has the linear or switching circuit to control the string current.

Below are presented embodiments of examples of a modular and scalable structure that can assist circuit designers with a systematic way to design a driver for required number of strings. The current-balancing function is accomplished by using multiple transformers connected in a daisy chain, in which the primary and secondary windings of each transformer are connected to two different modules, so that the currents through the two modules can be mutually coupled. The proposed daisy-chain transformer structure minimizes the adverse effect of the magnetizing inductance of the transformers on the current balancing. Moreover, an energy-recycling technique is used to assure that any abnormal condition occurred in an LED string does not affect the normal operation of the other strings.

Referring to FIG. 1, there is shown a diagram illustrating a simplified current distribution scheme 100. The inventors through their research, trials and experimentation have devised that an alternating electric current can be divided into a plurality of branches based a plurality of predefined parameters. For example, as shown in FIG. 1, a main current $i_M$ is shared among N branches where the currents in the branches are denoted as $i_1, i_2, \ldots, i_k, \ldots, i_N$. More specifically, the main current is related to the branch currents by the following equation:

$$i_1 + i_2 + \ldots + i_k + \ldots + i_N = i_M \qquad (1)$$

Preferably, the currents are alternating current (AC). In some other embodiments, however, the currents may also be direct currents (DC) in another embodiment.

Figure 2:
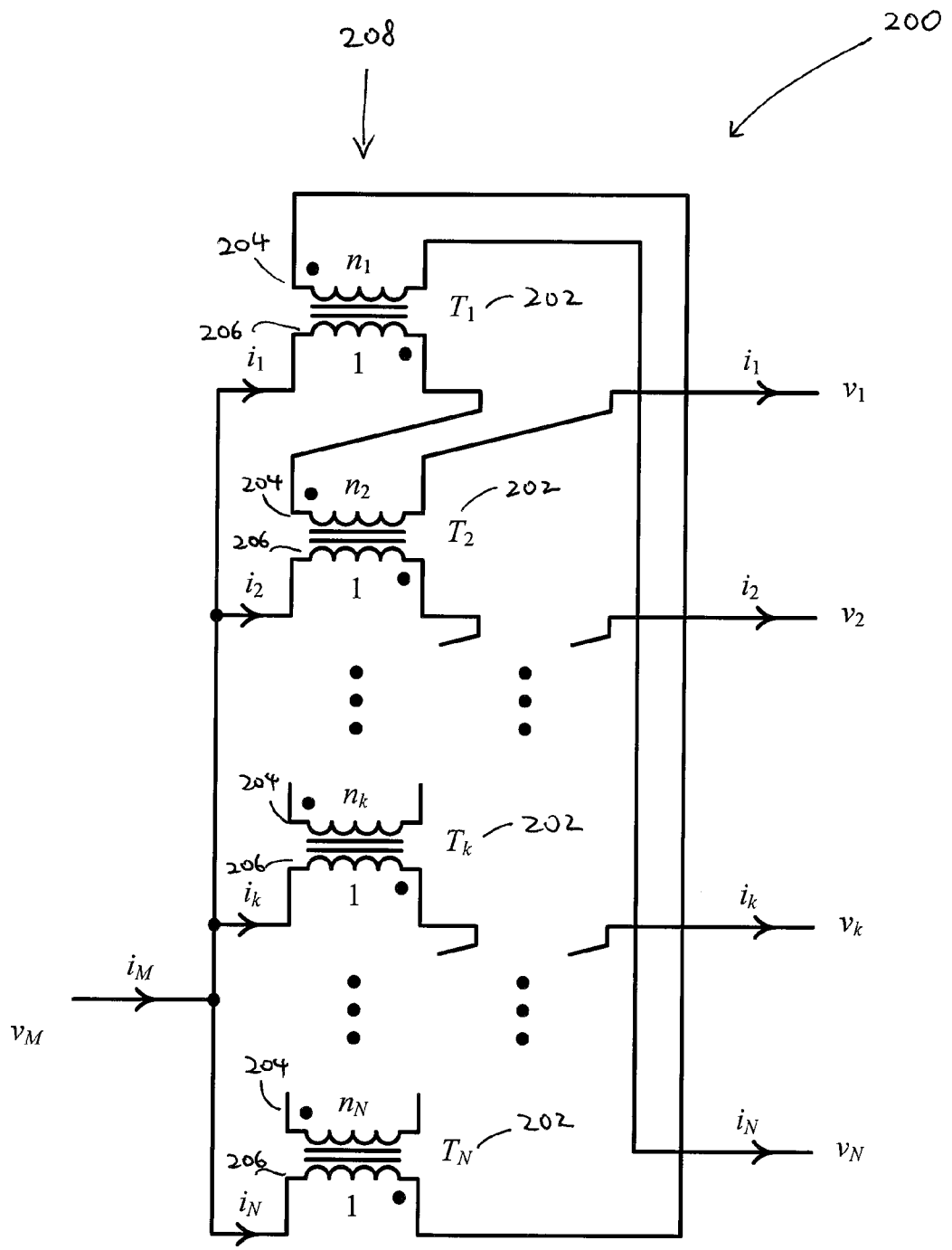
FIG. 2 is a diagram illustrating a current distribution apparatus in accordance with one embodiment of the present invention.

With reference to FIG. 2, there is illustrated an embodiment of a current distribution apparatus 200 comprising a common current source arranged to deliver an input current $i_M$ into a plurality of branches such that the input current $i_M$ is distributed into a plurality of individual branch currents; wherein each of the plurality of branches includes an inductive arrangement arranged to form an inductive coupling with an associated inductive arrangement of at least one other associated branch.

In this embodiment, the current distribution apparatus 200 is constructed by a number of magnetically coupled inductive components (transformers or transformer units) 202 connected in a daisy chained structure 208. As shown in FIG. 2, the primary coil 206 and the secondary coil 204 of each transformer unit 202 are disposed in adjacent branches. In particular, the primary coil 206 of each transformer unit 202 is disposed in the same branch as the secondary coil 204 of an adjacent transformer unit 202. Preferably, the required number of the transformers 202 is equal to the number of branches.

In this embodiment, the current flowing through each branch is determined by the turns ratios (ratio of the number of turns of coils in the primary coil 206 to the number of turns of coils in the secondary coil 204) of the transformers 202, i.e. $n_1, n_2, \ldots, n_k, \ldots, n_N$. Ideally, all transformers 202 have infinite magnetizing inductances. Accordingly, the currents in the branches can be expressed as follows:

$$i_1 = n_1 i_N \qquad (2)$$

$$i_2 = n_2 i_1 \qquad (3)$$

$$\vdots$$

$$i_k = n_k i_{k-1} \qquad (4)$$

$$\vdots$$

$$i_N = n_N i_{N-1}. \qquad (5)$$

Thus, substituting equations (2) to (5) into equation (1), it can be shown that $$i_k = \frac{\prod_{j=1}^{k} n_j}{n_1 + n_1 n_2 + \ldots + n_1 n_2 \ldots n_k + \ldots + n_1 n_2 \ldots n_N} i_M. \qquad (6)$$

In other words, equation (6) shows that the current in any one of the branches will depend on the turn ratios of the transformers 202 of the current distribution apparatus 200. In particular, an advantage of this embodiment is that the current division is substantially independent of the branch voltages $v_1, v_2, \ldots, v_k, \ldots, v_N$, and $v_M$.

Furthermore, in one particular embodiment, when $n_1 = n_2 = \ldots = n_k = \ldots = n_N = 1$, $$i_1 = i_2 = \ldots = i_k = \ldots = i_N = \frac{1}{N} i_M. \qquad (7)$$

This is advantageous in that the current $i_M$ is equally shared by the branches.

Figure 3:
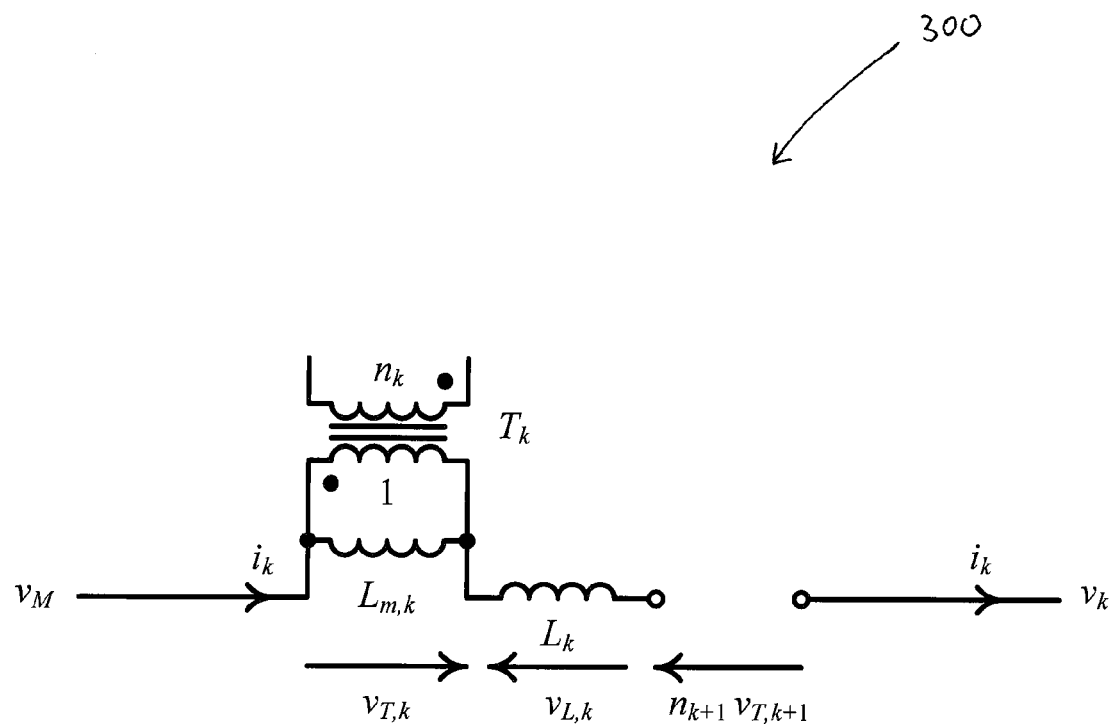
FIG. 3 is a diagram illustrating a branch of the current distribution apparatus of FIG. 2.

With reference to FIG. 3, there is shown a branch 300 of the current distribution apparatus of FIG. 2. In reality, practical transformers may have finite magnetizing inductance, leakage inductance, and resistance. FIG. 3 shows the equivalent circuit of the k-th branch, in which $L_{m,k}$ is the magnetizing inductance of the transformer $T_k$ and $L_k$ is the equivalent series inductance of the branch. Preferably, $L_k$ includes the leakage inductance of the transformer. In some embodiments, the resistance can be neglected.

By applying the Kirchhoff's voltage law to the branch 300, it can be shown that $$v_M + v_{T,k} - v_{L,k} - n_{k+1} v_{T,k+1} - v_k = 0 \qquad (8)$$

in which $v_{T,k}$ is the voltage across the magnetizing inductance $L_{m,k}$ of the transformer $T_k$, $v_{L,k}$ is the voltage across the equivalent series inductance $L_k$ of the branch 300, $v_M$ is the voltage at the input, $n_k$ is the turn ratio of the transformer $T_k$ and $v_k$ is the voltage at the output of the branch 300.

Accordingly, by using equation (8) for the N branches, it can be shown that the voltages $v_{T,k}$, $v_{L,k}$, $v_M$ and $v_k$ are related to the turn ratio $n_k$ of the transformer $T_k$ by the following:

$$\begin{bmatrix} -1 & n_2 & 0 & 0 & \ldots & 0 & 0 \\ 0 & -1 & n_3 & 0 & 0 & \ldots & 0 \\ \vdots & \vdots & \ddots & \ddots & \ddots & \ddots & \vdots \\ 0 & 0 & \ldots & -1 & n_k & \ldots & 0 \\ \vdots & \vdots & \ddots & \ddots & \ddots & \ddots & \vdots \\ 0 & 0 & \ldots & 0 & \ldots & -1 & n_N \\ n_1 & 0 & \ldots & 0 & \ldots & 0 & -1 \end{bmatrix} \begin{bmatrix} v_{T,1} \\ v_{T,2} \\ \vdots \\ v_{T,k} \\ \vdots \\ v_{T,N-1} \\ v_{T,N} \end{bmatrix} = \begin{bmatrix} v_M - v_1 \\ v_M - v_2 \\ \vdots \\ v_M - v_k \\ \vdots \\ v_M - v_{N-1} \\ v_M - v_N \end{bmatrix} \begin{bmatrix} v_{L,1} \\ v_{L,2} \\ \vdots \\ v_{L,k} \\ \vdots \\ v_{L,N-1} \\ v_{L,N} \end{bmatrix} \qquad (9)$$

On the other hand, in this embodiment, the voltage $v_{L,k}$ across the equivalent series inductance $L_k$ of the k-th branch can be expressed as:

$$v_{L,k} = s L_k i_k \qquad (10)$$

where $s = j\omega$ is the Laplace operator and $\omega$ is the operating frequency.

By using equation (10) for N branches, it can be shown that $$\begin{bmatrix} v_{L,1} \\ v_{L,2} \\ \vdots \\ v_{L,k} \\ \vdots \\ v_{L,N-1} \\ v_{L,N} \end{bmatrix} = \begin{bmatrix} sL_1 & 0 & 0 & 0 & \ldots & 0 & 0 \\ 0 & sL_2 & 0 & 0 & 0 & \ldots & 0 \\ \vdots & \vdots & \vdots & \ddots & \ddots & \ddots & \vdots \\ 0 & 0 & \ldots & sL_k & 0 & \ldots & 0 \\ \vdots & \vdots & \ddots & \ddots & \ddots & \ddots & \vdots \\ 0 & 0 & \ldots & 0 & \ldots & sL_{N-1} & 0 \\ 0 & 0 & \ldots & 0 & \ldots & 0 & sL_N \end{bmatrix} \begin{bmatrix} i_1 \\ i_2 \\ \vdots \\ i_k \\ \vdots \\ i_{N-1} \\ i_N \end{bmatrix}. \qquad (11)$$

This illustrates that the voltage $v_{L,k}$ across the equivalent series inductance $L_k$ of the k-th branch is related to the current $i_k$ of the k-th branch.

In this embodiment, as illustrated above, the current among difference branches are inter-related. Furthermore, by applying the Kirchhoff's current law, it can be shown that $$-n_k i_{k-1} + i_k = -\frac{v_{T,k}}{sL_{m,k}} \tag{12}$$

in which $n_k$ is the turn ratio of the transformer $T_k$, $i_k$ is the current in the k-th branch, $L_{m,k}$ is magnetizing inductance of the transformer $T_k$, $v_{T,k}$ is the voltage across the magnetizing inductance $L_{m,k}$ of the transformer $T_k$ and $s=j\omega$ is the Laplace operator where $\omega$ is the operating frequency. Preferably, in the above expression, when k=1, (k−1)=N.

By arranging equation (12) into matrix form, the following equation can be obtained:

$$\begin{bmatrix} 1 & 0 & 0 & 0 & \cdots & 0 & -n_1 \\ -n_2 & 1 & 0 & 0 & 0 & \cdots & 0 \\ \vdots & \vdots & \ddots & \ddots & \ddots & \ddots & \vdots \\ 0 & 0 & \cdots & -n_k & 1 & \cdots & 0 \\ \vdots & \vdots & \ddots & \ddots & \ddots & \ddots & \vdots \\ 0 & 0 & \cdots & 0 & \cdots & 1 & 0 \\ 0 & 0 & \cdots & 0 & \cdots & -n_N & 1 \end{bmatrix} \begin{bmatrix} i_1 \\ i_2 \\ \vdots \\ i_k \\ \vdots \\ i_{N-1} \\ i_N \end{bmatrix} = \tag{13}$$

$$[Z] = \begin{bmatrix} sL_{m,1}+n_2^2 sL_{m,2}+sL_1 & -n_2 sL_{m,2} & 0 & 0 & \cdots & 0 & -n_1 sL_{m,1} \\ -n_2 sL_{m,2} & sL_{m,2}+n_3^2 sL_{m,3}+sL_2 & -n_3 sL_{m,3} & 0 & 0 & \cdots & 0 \\ \vdots & \vdots & \vdots & \ddots & \ddots & \ddots & \vdots \\ 0 & 0 & \cdots & -n_k sL_{m,k} & sL_{m,k}+n_{k+1}^2 sL_{m,k+1}+sL_k & -n_{k+1} sL_{m,k+1} & 0 \\ \vdots & \vdots & \ddots & \ddots & \ddots & \ddots & \vdots \\ 0 & 0 & \cdots & 0 & \cdots & sL_{m,N-1}+n_N^2 sL_{m,N}+sL_{N-1} & 0 \\ -n_1 sL_{m,1} & 0 & \cdots & 0 & \cdots & -n_N sL_{m,N} & sL_{m,N}+n_1^2 sL_{m,1}+sL_N \end{bmatrix}$$

-continued $$\begin{bmatrix} -\frac{1}{sL_{m,1}} & 0 & 0 & 0 & \cdots & 0 & 0 \\ 0 & -\frac{1}{sL_{m,2}} & 0 & 0 & 0 & \cdots & 0 \\ \vdots & \vdots & \vdots & \ddots & \ddots & \ddots & \vdots \\ 0 & 0 & \cdots & -\frac{1}{sL_{m,k}} & 0 & \cdots & 0 \\ \vdots & \vdots & \ddots & \ddots & \ddots & \ddots & \vdots \\ 0 & 0 & \cdots & 0 & \cdots & -\frac{1}{sL_{m,N-1}} & 0 \\ 0 & 0 & \cdots & 0 & \cdots & 0 & -\frac{1}{sL_{m,N}} \end{bmatrix}$$

-continued $$\begin{bmatrix} v_{T,1} \\ v_{T,2} \\ \vdots \\ v_{T,k} \\ \vdots \\ v_{T,N-1} \\ v_{T,N} \end{bmatrix}.$$

As shown in equation (13), the voltage $v_{T,k}$ across the magnetizing inductance of the transformer $T_k$ is related to the current $i_k$ in the k-th branch.

In this embodiment, by further using equations (9), (11) and (13) (eliminating $v_{T,k}$ and $v_{L,k}$ from equation (9)), it can be shown that $$\begin{bmatrix} i_1 \\ i_2 \\ \vdots \\ i_k \\ \vdots \\ i_{N-1} \\ i_N \end{bmatrix} = [Y] \begin{bmatrix} v_M - v_1 \\ v_M - v_2 \\ \vdots \\ v_M - v_k \\ \vdots \\ v_M - v_{N-1} \\ v_M - v_N \end{bmatrix} \tag{14}$$

where $[Y]=[Z]^{-1}$ and

Equation (14) shows the relationship of the current in the k-th branch and the voltage difference $v_M-v_k$ across the respective branch. In a preferred embodiment, [Z] is arranged such that the current $i_k$ of the k-th branch is substantially independent of the voltage difference $v_m-v_k$ across the respective branch.

A further illustration of the current distribution apparatus in one embodiment is provided as follows. In this example, the current distribution apparatus is arranged to have three branches. In the following, $V_M$, $v_1$, $v_2$, and $v_3$ are dc voltages. By arranging the magnetization inductance in each branch to be the same ($L_{m,1}=L_{m,2}=L_{m,3}=L_m$), and the equivalent series inductance in each branch to be the same ($L_1=L_2=L_3=L$), it can be shown that $$i_1(t) = \frac{L(v_M - v_1) + L_m(3v_M - v_1 - v_2 - v_3)}{L(L + 2L_m)} t \tag{15}$$

-continued $$i_2(t) = \frac{L(v_M - v_2) + L_m(3v_M - v_1 - v_2 - v_3)}{L(L + 3L_m)} t \quad (16)$$

$$i_3(t) = \frac{L(v_M - v_3) + L_m(3v_M - v_1 - v_2 - v_3)}{L(L + 3L_m)} \quad (17)$$

Advantageously, in this embodiment, it can be observed that if $L_m$ is large, the currents i(t) of the three branches will be substantially the same.

Although in the above example, the current distribution apparatus is arranged to have three branches. However, in some other embodiments, the current distribution apparatus may have any number of branches and the current in each branch may not necessarily have to be equal.

One particular advantage of the current distribution apparatus in the present invention is that the current in each branch is substantially independent of the voltage across the branch. This would mean that the current distribution apparatus is relatively immune from the voltage fluctuations and changes in the circuit or network. Another advantage of the current distribution apparatus in the present invention is that the current in individual branches can be flexibly manipulated by controlling the turn ratios of the transformer units. Also, the current distribution ratio of the apparatus will be less susceptible to current fluctuations in individual branches.

Figure 4:
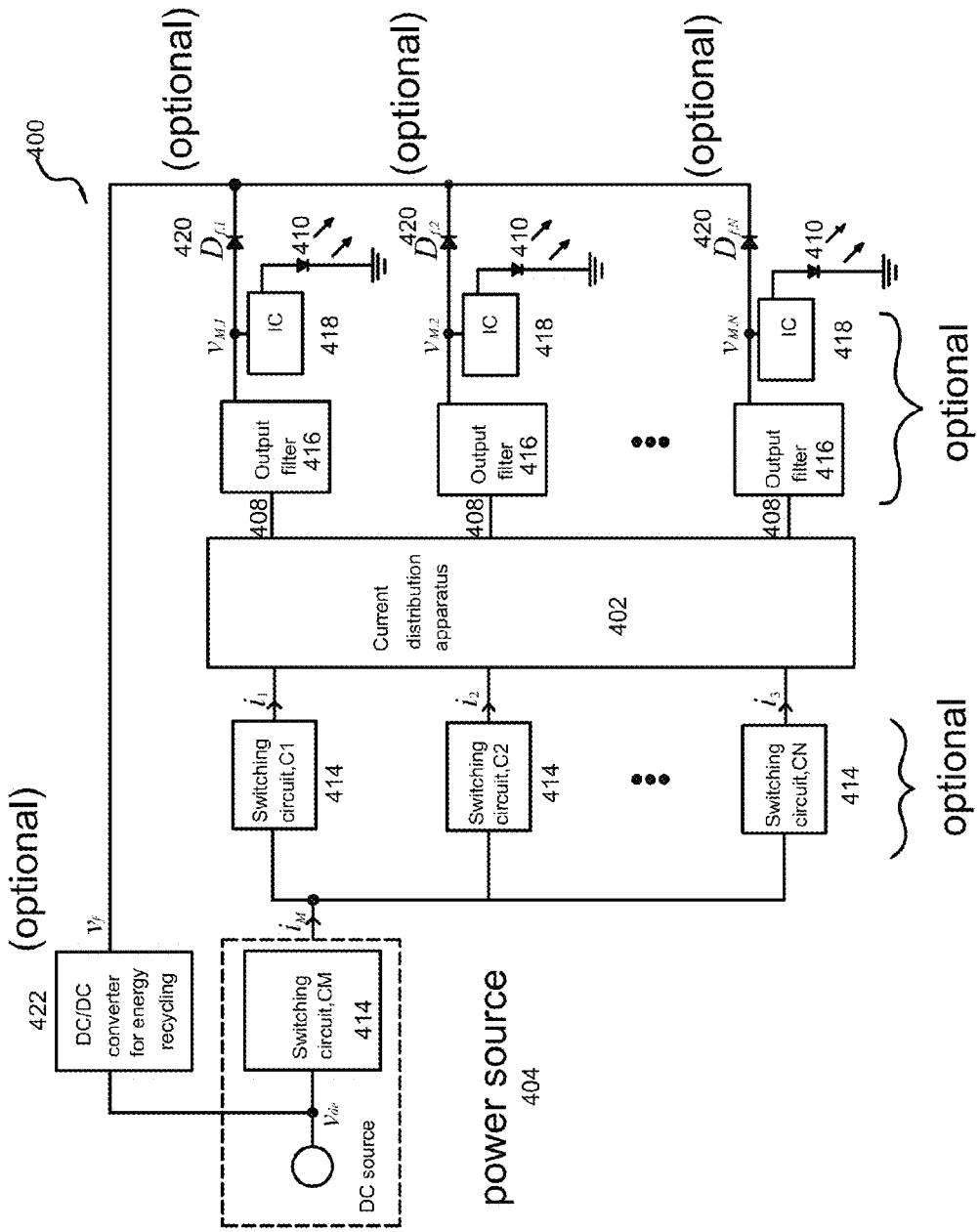
FIG. 4 is a block diagram illustrating an electrical load driving apparatus in accordance with one embodiment of the present invention.
Figure 5:
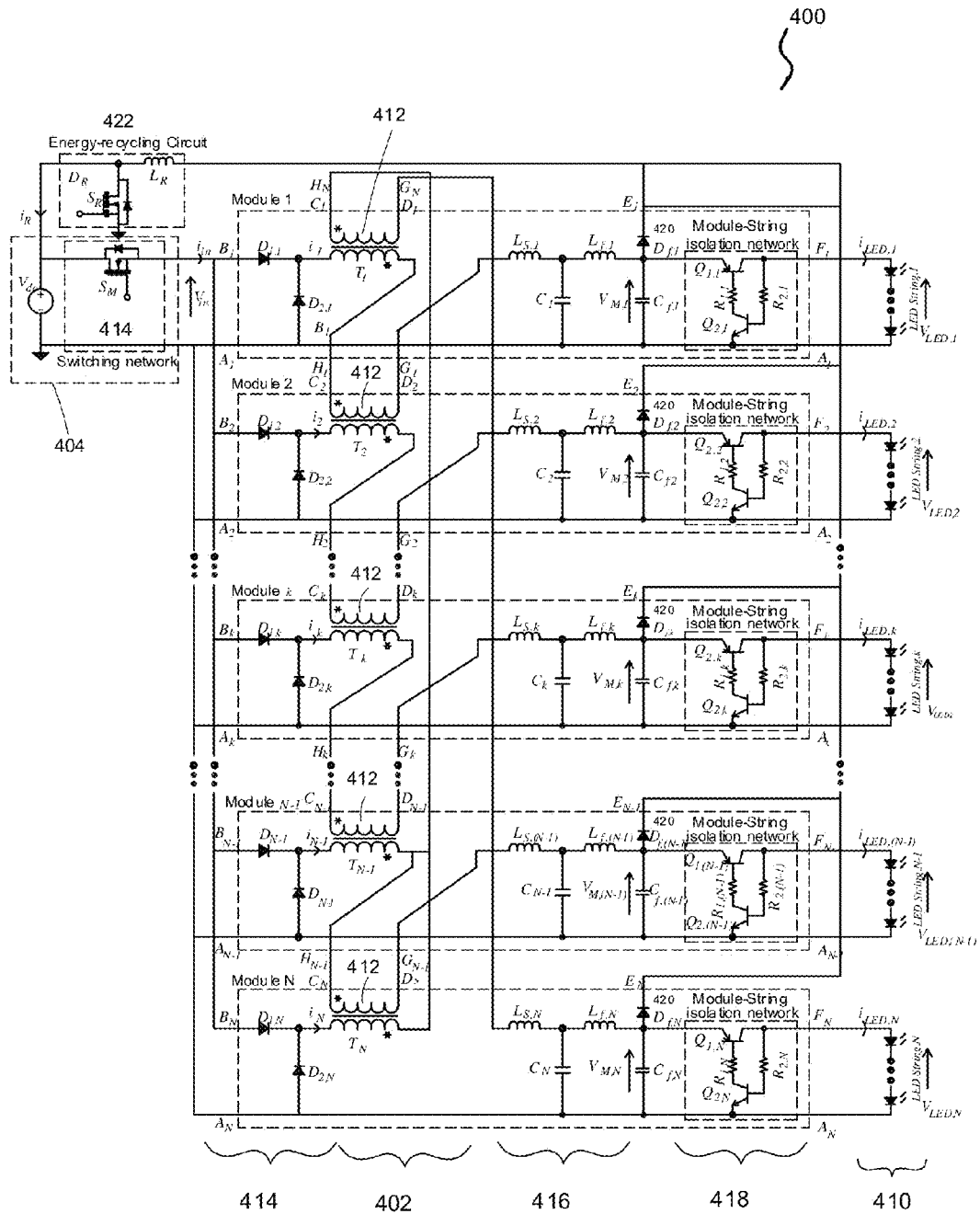
FIG. 5 is a schematic diagram illustrating the electrical load driving apparatus of FIG. 4.

Referring to FIGS. 4 and 5, there is shown a first embodiment of an electrical load driving apparatus 400, comprising a current distribution apparatus 402 having a power source 404 arranged to deliver an input current 406 into a plurality of branches 408 such that the input current is distributed into a plurality of individual branch currents; wherein each of the plurality of branches 408 includes an inductive arrangement 412 arranged to form an inductive coupling with an associated inductive arrangement of at least one other associated branch 408; and a plurality of output loads 410 connect to each of the associated branches 408 of the current distribution apparatus 402.

Preferably, the current distribution apparatus is in a daisy chain transformer structure (DCTS). Optionally, the electrical load driving apparatus may comprise additional components such as a plurality of switching circuits 414, output filters 416, isolation circuit 418, a plurality of diodes 420, recycling circuits 422 or LED strings in other preferred embodiments.

In one embodiment, the electrical load driving apparatus 400 consist of the following components:
 1. Switching circuit, CM
 2. Daisy chain transformer structure (DCTS)
 3. Switching circuits, C1, C2, . . . , CN
 4. Output filters
 5. Module-string isolation circuit (MSIC)
 6. OR-ing diodes $D_{f,1}, D_{f,2}, \ldots, D_{f,N}$
 7. DC-DC converter for energy recycling
 8. LED strings Referring to FIG. 5, the electrical load driving apparatus is powered by $V_{dc}$. The switching circuit CM is used to generate alternating voltage or current at its output. Alternatively, an alternating voltage or current can be used as the power source of the current distribution apparatus. In this embodiment, a switching circuit is used to produce the necessary input requirements for the DCTS. Preferably, the switching circuit Ck is formed by the diodes $D_{1,k}$ and $D_{2,k}$, wherein $D_{1,k}$ prevent current from flowing from one LED string to another, and $D_{2,k}$ maintain the current flow when the voltage applied to the switching circuits, C1, C2, . . . , CN is zero, and thus $D_{1,k}$ is off.

Preferably, the DCTS is used to balance the currents of $i_1$, $i_2$, . . . , $i_N$ equally from the main current $i_M$. The output of the DCTS is connected to output filter to provide high quality driving current to the diode strings.

In an alternative embodiment, the electrical load driving apparatus further comprises a plurality of isolation circuits (IC) noted as module-string isolation circuits (MSIC), and a plurality of diodes noted as OR-ing diodes $D_{f,1}, D_{f,2}, \ldots, D_{f,N}$ are used to maintain the normal operation of all strings when there is any LED string failure. When there is a failure in any LED string, for example, open circuit, fully/partially short circuit to certain extent, the module-string isolation circuit associated with the LED string will disconnected the string from the output filter. Since the DCTS keeps its operation and deliver currents to the output filter, the output voltage of the output filter $v_{M,k}$ (assume that k-th module has LED failure) will increase. Then, the associated OR-ing diode $D_{f,k}$ will be on. The energy-recycling circuit will be activated to transfer the energy back to the input. Thus, as the energy is recycled, $v_f$ and thus $V_{M,k}$ can be regulated at the safety level and the operations of the other strings can be assured.

With reference to FIG. 5, in this embodiment, all modules are connected to the same input source $v_{in}$, which is an output of a switching network and consists of high-frequency voltage pulses. The LED string currents are balanced by N transformers connected in a daisy chain. The primary winding and the secondary winding of each transformer are connected to two modules. The switching network is a single switch $S_M$, and the switching frequency is programmed to make the transformer currents discontinuous. Hence, the average current through each LED string is determined by the ac current through the transformers.

During the operation of the electrical load driving apparatus, in some occasions, a failure in an output load, such as an LED string, can be open or short. When the failure LED string forms an open circuit, its associated string current will be zero. When the failure LED is short circuit, the transistor $Q_{1,k}$ will be turned off so that no current will flow through the string. In both faulty cases, the module output voltage $v_{M,k}$ will increase. To limit the magnitude of $v_{M,k}$, the module output is connected to recycling circuit, preferably a converter through a diode $D_{f,k}$ for recycling the energy processed by the module back to the input.

The operation of an example embodiment is described as follows. For the sake of simplicity in analysis, the following assumptions have been made:
 1. The components are all ideal.
 2. The transformer $T_k$ has the turns ratio of 1:$n_k$. It has magnetizing inductance $L_{m,k}$, leakage inductance of $L_{g,k}$, zero core loss, and zero series resistance.
 3. The voltage across $C_k$ is constant and is equal to the LED string voltage $V_{LED,k}$.
 4. The LED strings have different forward voltage. Their relative magnitudes are assumed as follows:

$$v_{LED,1} < v_{LED,2} < v_{LED,3} < \ldots < v_{LED,N-2} < v_{LED,N-1} < v_{LED,N} \quad (18).$$

Figure 6:
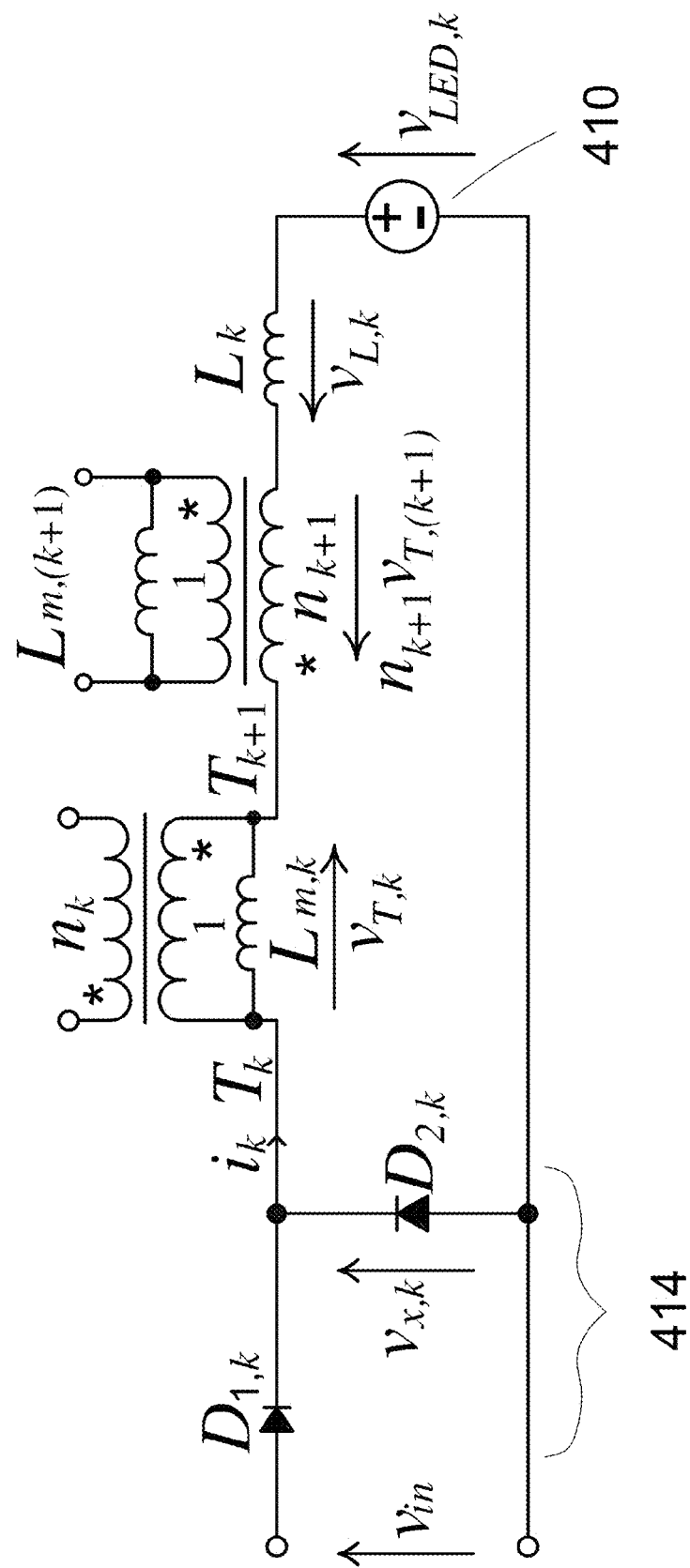
FIG. 6 is a schematic diagram illustrating an equivalent circuit of an individual branch of the current distribution apparatus of the electrical load driving apparatus of FIG. 5.

With reference to the equivalent circuit of module k as shown in FIG. 6, and according to the above assumptions, the inductor $L_k$ is the equivalent inductor of leakage inductors of transformers $T_k$ and $T_{k+1}$ and the series inductor $L_{s,k}$ in FIG. 5. The proposed architecture has maximum "2 plus N" modes of operation in one switching cycle. The transformers are in closed-chain operation in the first two operating modes while they are in open-chain operation in the rest of the N modes. The first mode (Mode 1) refers to the operation when $S_M$ is turned on, and ends when $S_M$ is turned off. The second mode (Mode 2) starts immediate after Mode 1, and ends when the freewheeling diode of Module N, $D_{2,N}$, stops conducting and the current $i_N$ through the transformer $T_N$ is zero. $i_N$ is the first one reducing to zero because the string voltage $V_{LED,k}$ is the highest among all modules. Starting from the Mode 3 to Mode (N+2), the transformers are effectively coupled in an open chain configuration. An operating mode finishes when one of the transformer currents reduces to zero.

The operations of Modes 1 and 2 are similar. The only difference is that $v_x = v_{dc}$ in Mode 1, and $v_x = 0$ in Mode 2. Thus, a general form for analyzing both modes will be derived. Let $$V_T(s) = [V_{T,1}(s) V_{T,2}(s) V_{T,3}(s) \ldots V_{T,N}(s)]^T,$$

$$V_x(s) = [V_{x,1}(s) V_{x,2}(s) V_{x,3}(s) \ldots V_{x,N}(s)]^T,$$

$$V_{LED}(s) = [V_{LED,1}(s) V_{LED,2}(s) V_{LED,3}(s) \ldots V_{LED,N}(s)]^T,$$

$$V_L(s) = [V_{L,1}(s) V_{L,2}(s) V_{L,3}(s) \ldots V_{L,N}(s)]^T,$$

$$I(s) = [I_1(s) I_2(s) I_3(s) \ldots I_N(s)]^T,$$

$V_{T,k}(s)$, $V_{x,k}(s)$, $V_{LED,k}(s)$, $V_{L,k}(S)$ and $I_k(s)$ are the Laplace-transformed functions of $v_{T,k}$, $v_{x,k}$, $v_{LED,k}$, $v_{L,k}$ and $i_k$, respectively. The current flowing through the transformers is presented as $$I(s) = \Psi(s)^{-1}[V_x(s) - V_{LED}(s) + \phi i(t_{j-1})] \quad (19)$$

where $$\Psi(s) = -N_1 Z_m(s) N_2 + Z_L(s),$$

$$\phi = L - N_1 L_m N_2,$$

$i(t_{j-1}) = [i_1(t_{j-1}) i_2(t_{j-1}) i_3(t_{j-1}) \ldots i_N(t_{j-1})]^T$ (j=1 for Mode 1, and j=2 for Mode 2), $$N_1 = \begin{bmatrix} -1 & n_2 & 0 & 0 & \ldots & 0 & 0 \\ 0 & -1 & n_3 & 0 & 0 & \ldots & 0 \\ 0 & 0 & -1 & n_4 & \ddots & \ddots & \vdots \\ \vdots & 0 & \ddots & \ddots & \ddots & 0 & 0 \\ 0 & \vdots & \ddots & 0 & -1 & n_{N-1} & 0 \\ 0 & 0 & \ldots & 0 & 0 & -1 & n_N \\ n_1 & 0 & 0 & \ldots & 0 & 0 & -1 \end{bmatrix},$$

$$Z_m(s) = \begin{bmatrix} sL_{m,1} & 0 & 0 & \ldots & 0 & 0 \\ 0 & sL_{m,2} & 0 & \ldots & 0 & 0 \\ 0 & 0 & sL_{m,3} & \ddots & \ddots & \vdots \\ \vdots & \ddots & \ddots & \ddots & 0 & 0 \\ 0 & 0 & \ldots & 0 & sL_{m,N-1} & 0 \\ 0 & 0 & \ldots & 0 & 0 & sL_{m,N} \end{bmatrix},$$

$$N_2 = \begin{bmatrix} 1 & 0 & 0 & \ldots & 0 & 0 & -n_1 \\ -n_2 & 1 & 0 & 0 & \ldots & 0 & 0 \\ 0 & -n_3 & 1 & 0 & \ddots & \vdots & \vdots \\ 0 & 0 & \ddots & \ddots & \ddots & 0 & 0 \\ \vdots & 0 & \ddots & -n_{N-2} & 1 & 0 & 0 \\ 0 & \vdots & \ddots & 0 & -n_{N-1} & 1 & 0 \\ 0 & 0 & \ldots & 0 & 0 & -n_N & 1 \end{bmatrix},$$

$$Z_L(s) = \begin{bmatrix} sL_1 & 0 & 0 & 0 & \ldots & 0 & 0 \\ 0 & sL_2 & 0 & 0 & \ldots & 0 & \vdots \\ 0 & 0 & sL_3 & 0 & \ddots & \vdots & 0 \\ 0 & 0 & 0 & \ddots & \ddots & 0 & 0 \\ \vdots & \vdots & \ddots & \ddots & sL_{N-2} & 0 & 0 \\ 0 & 0 & \ldots & 0 & 0 & sL_{N-1} & 0 \\ 0 & 0 & \ldots & 0 & 0 & 0 & sL_N \end{bmatrix},$$

$$L = \begin{bmatrix} L_1 & 0 & 0 & 0 & \ldots & 0 & 0 \\ 0 & L_2 & 0 & 0 & \ldots & 0 & \vdots \\ 0 & 0 & L_3 & 0 & \ddots & \vdots & 0 \\ 0 & 0 & 0 & \ddots & \ddots & 0 & 0 \\ \vdots & \vdots & \ddots & \ddots & L_{N-2} & 0 & 0 \\ 0 & 0 & \ldots & 0 & 0 & L_{N-1} & 0 \\ 0 & 0 & \ldots & 0 & 0 & 0 & L_N \end{bmatrix},$$

$$L_m(s) = \begin{bmatrix} L_{m,1} & 0 & 0 & \ldots & 0 & 0 \\ 0 & L_{m,2} & 0 & \ldots & 0 & 0 \\ 0 & 0 & L_{m,3} & \ddots & \ddots & \vdots \\ \vdots & \ddots & \ddots & \ddots & 0 & 0 \\ 0 & 0 & \ldots & 0 & L_{m,N-1} & 0 \\ 0 & 0 & \ldots & 0 & 0 & L_{m,N} \end{bmatrix}.$$

Thus, the transformer voltages can be obtained $$V_T(s) = -Z_m(s) N_2 I(s) + L_m N_2 i(t_{j-1}) \quad (20).$$

When operation is in Mode j ($3 \leq j < N+1$), after $i_N$ has reached zero, the transformers are equivalently in an open chain operation. Consider a generic operating mode, Mode j. At the beginning of this mode, $$i_N = i_{N-1} = \ldots = i_{N-j+3} = 0 \quad (21)$$

By using (19), the currents $i_1$, $i_2$, $i_3$, . . . , $i_{N-j+2}$ can be expressed as $$I_j(s) = \Psi_{N-j+2}(s)^{-1}[V_{x(N-j+2)}(s) - V_{LED(N-j+2)}(s) + \phi_{N-j+2} i_j(t_{j-1})] \quad (22)$$

where $$I_j(s) = [I_1(s) I_2(s) I_3(s) \ldots I_{N-j+2}(s)]^T,$$

$\Psi_{N-j+2}(s)$ is the cofactor of the element in the N−j+3 row and N−j+3 column of $\Psi_{N-j+3}(s)$, $$i_j(t_{j-1}) = [i_1(t_{j-1}) i_2(t_{j-1}) i_3(t_{j-1}) \ldots i_{N-j+2}(t_{j-1})]^T,$$

and $\phi_{N-j+2}$ is the cofactor of the element in the N−j+3 row and N−j+3 column of $\phi_{N-j+3}$.

When the operation is in Mode N+2, all transformer currents are zero in this mode. That is, $$i_1 = i_2 = i_3 = \ldots = i_N = 0 \quad (23)$$

the mode ends when the switch $S_M$ is turned on. The system will enter into Mode 1 again.

Figure 7:
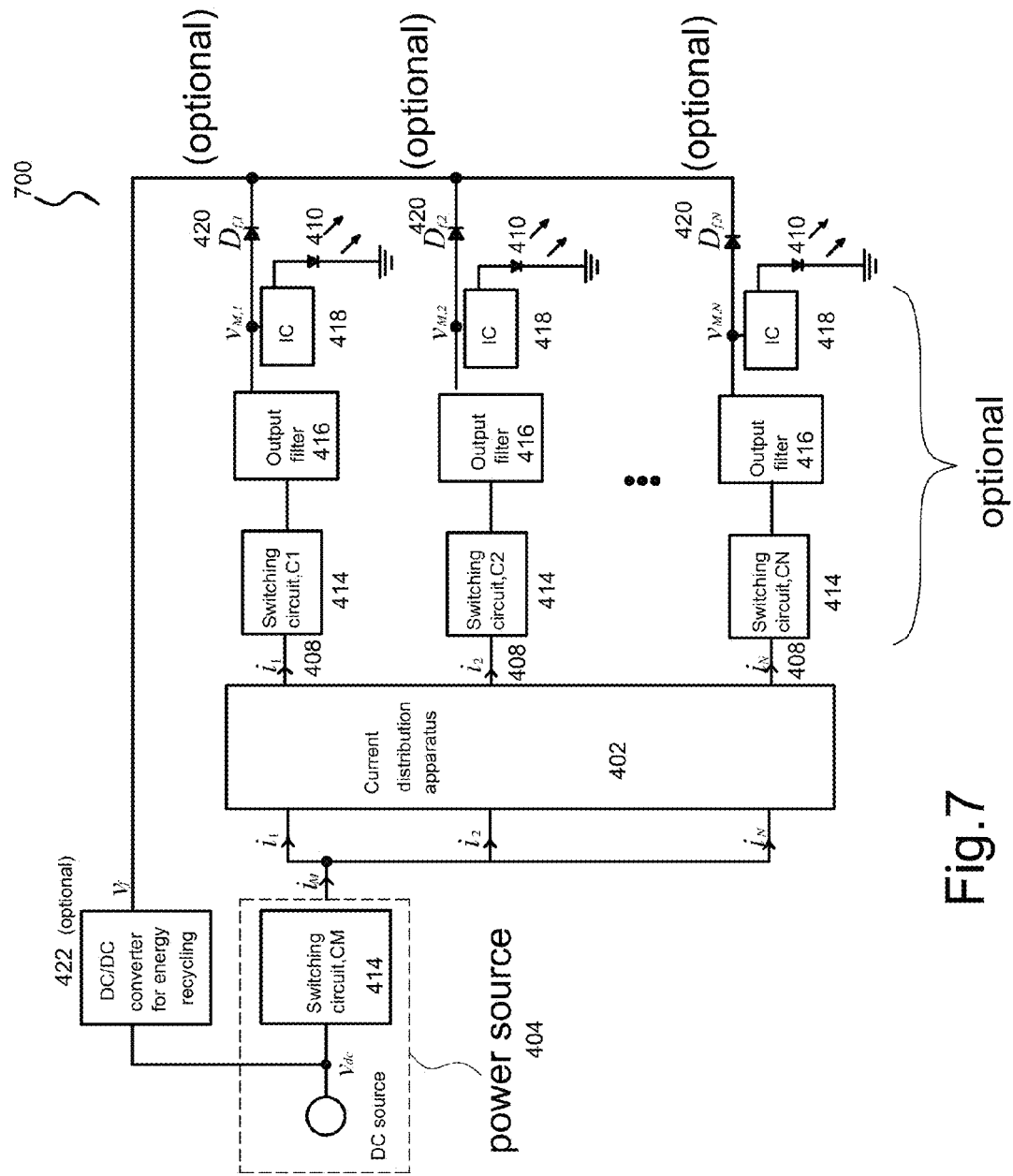
FIG. 7 is a block diagram illustrating an electrical load driving apparatus in accordance with another embodiment of the present invention.
Figure 8:
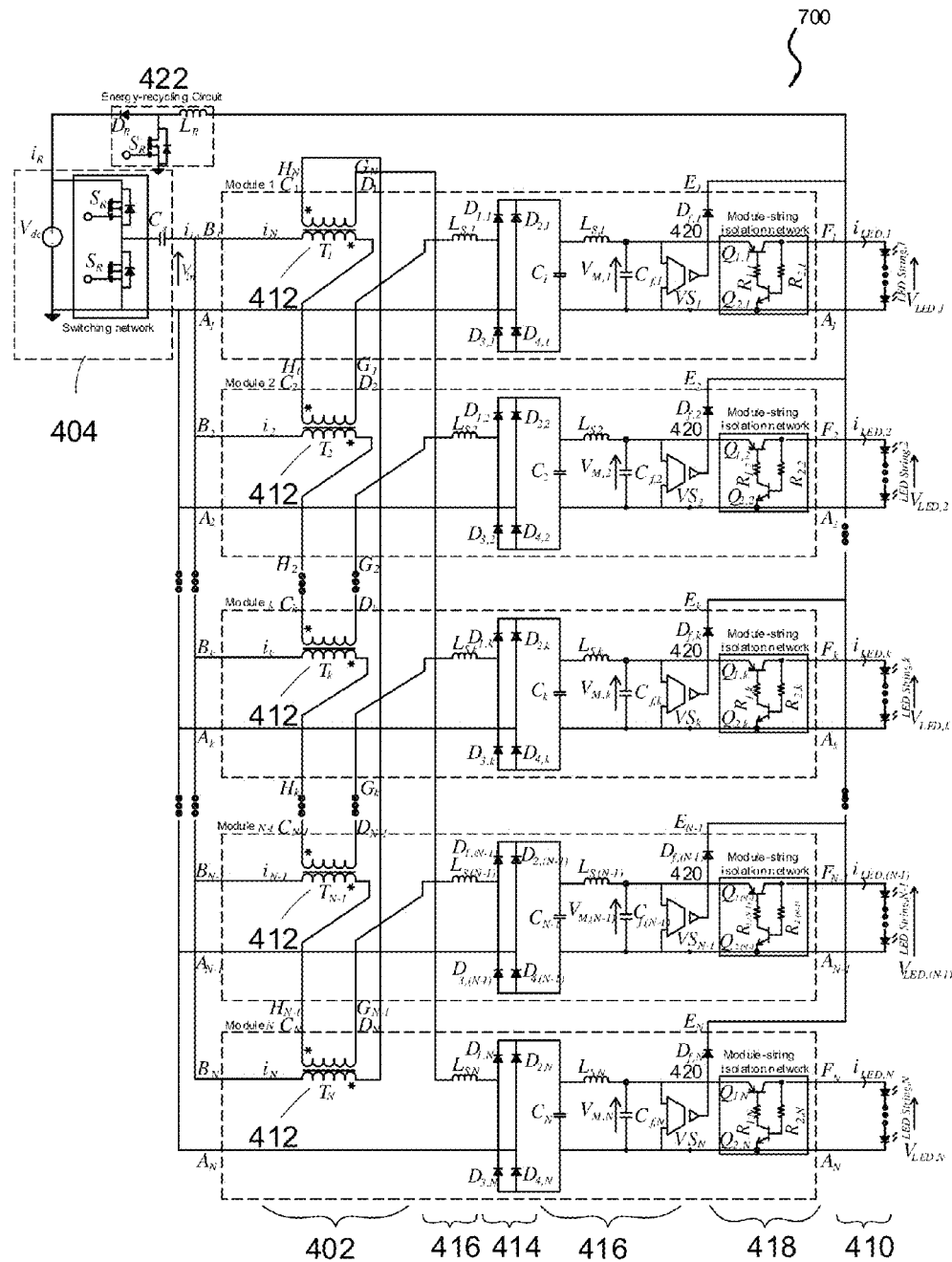
FIG. 8 is a schematic diagram illustrating the electrical load driving apparatus of FIG. 7.

Referring to FIGS. 7 and 8, there is shown a second embodiment of an electrical load driving apparatus 700, comprising a current distribution apparatus 402 having a power source 404 arranged to deliver an input current 406 into a plurality of branches 408 such that the input current 406 is distributed into a plurality of individual branch currents 410; wherein each of the plurality of branches 408 includes an inductive arrangement 412 arranged to form an inductive coupling with an associated inductive arrangement of at least one other associated branch 408; and a plurality of output loads 414 connect to each of the associated branches 408 of the current distribution apparatus 402.

With reference to FIGS. 4 and 7, the structure of the second embodiment is similar to the first embodiment, except that the positions of the current distribution apparatus and the switching circuits, C1, C2, . . . , CN, are swapped.

Referring to FIGS. 7 and 8, in this embodiment, the switching circuit CM generates alternating voltage and current to the current distribution apparatus, which balances currents of $i_1, i_2, \ldots, i_N$ equally from the main current $i_M$. The switching circuits C1, C2, . . . , CN, are used to convert $i_1, i_2, \ldots, i_N$ into the suitable form for the output filters. Preferably, the switching circuits are full-bridge diodes that rectifies $i_1, i_2, \ldots, i_N$ for the output filters.

Preferably, the switching circuit, CM, has a half-bridge formed by switches $S_1$ and $S_2$, and capacitor $C_s$. $C_s$ and the DCTS form a series resonant circuit. The switching circuits C1, C2, . . . , CN are formed by a diode full-bridge, formed by $D_{1,k}$–$D_{4,k}$.

In one preferred embodiment, the LED strings shown in FIGS. 5 and 8 have the arrangement that any faulty LED in the string will not affect the operation of the rest of the LEDs.

Figure 9:
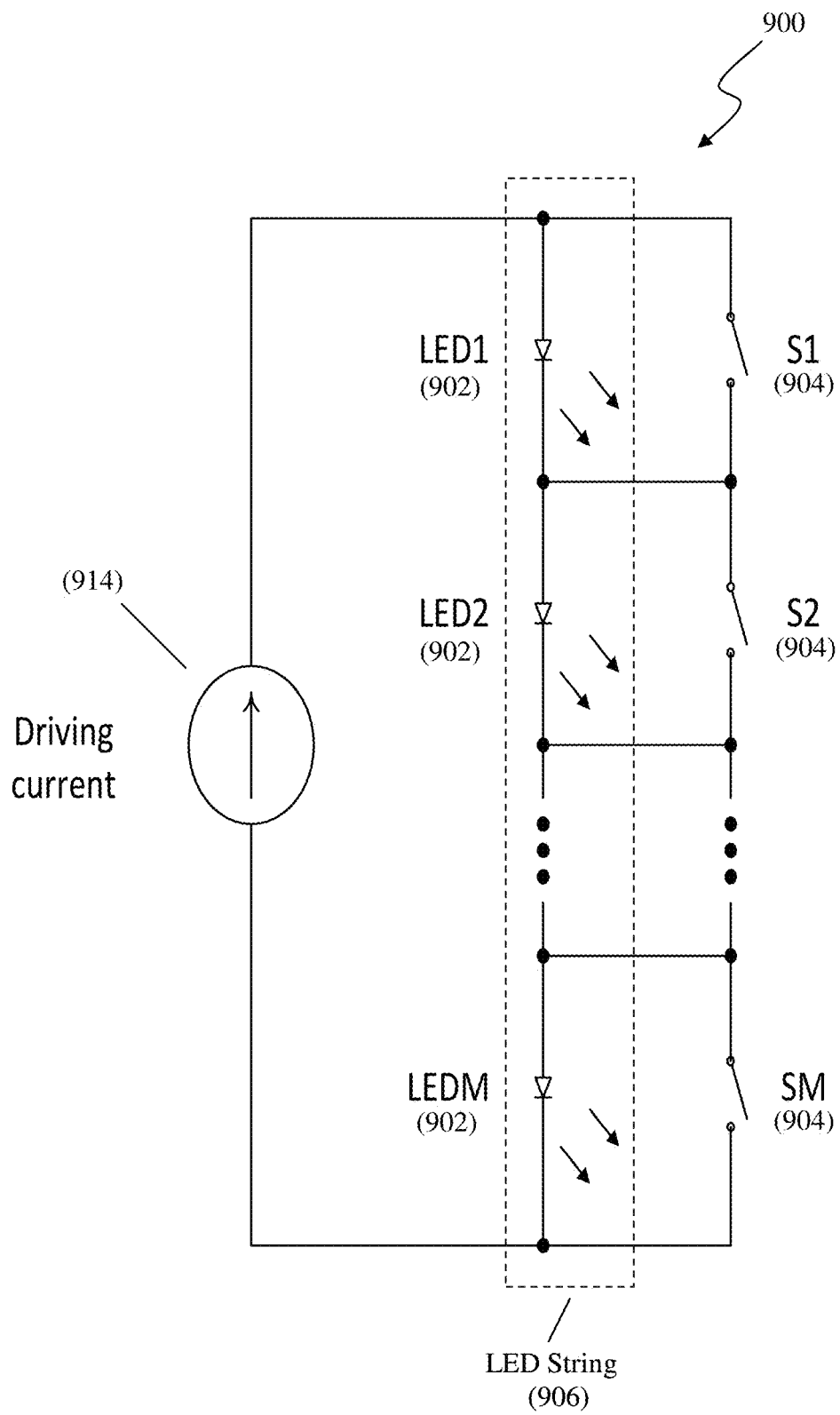
FIG. 9 is a schematic diagram illustrating an equivalent circuit of an electrical load switching apparatus in accordance with one embodiment of the present invention.
Figure 10:
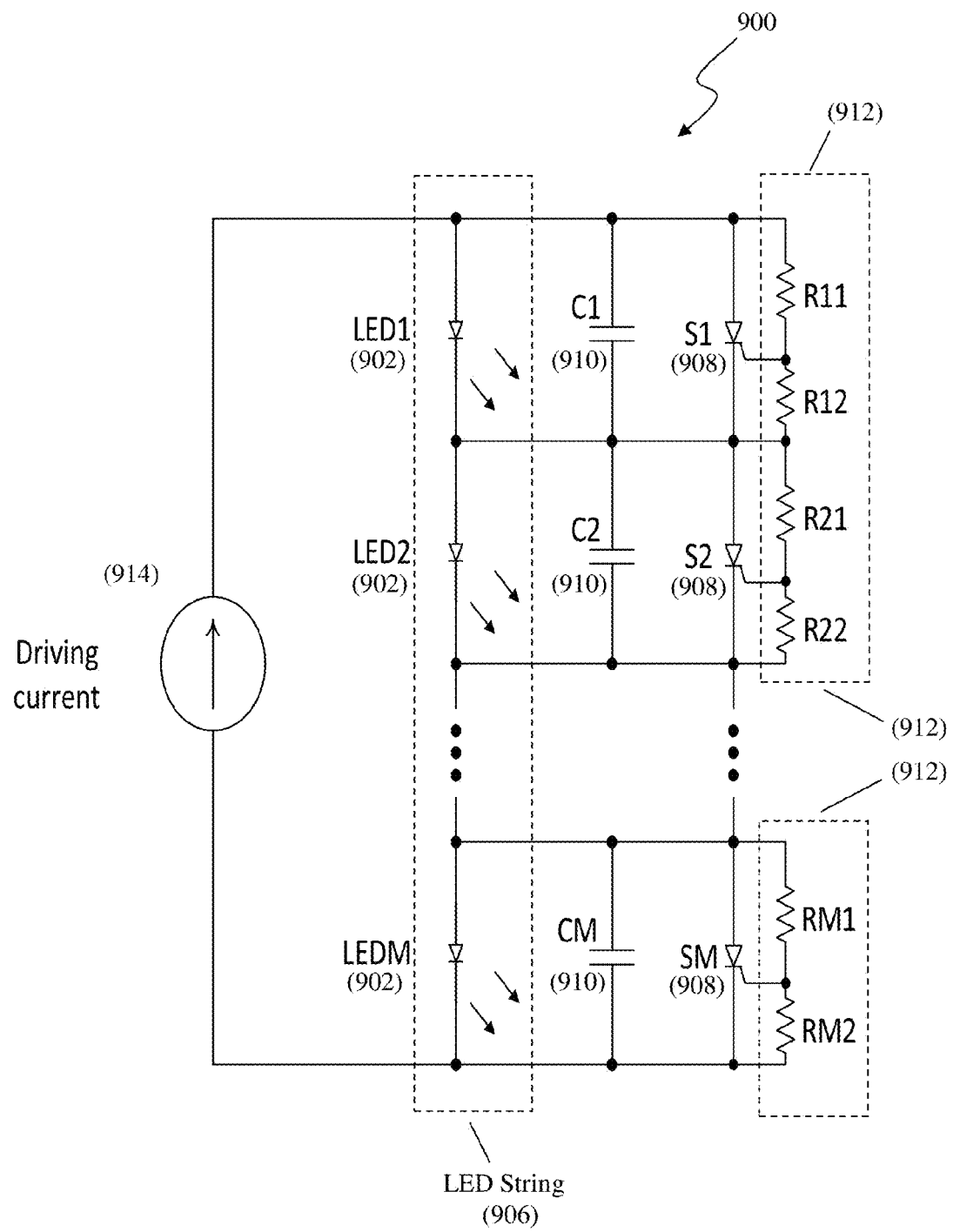
FIG. 10 is a schematic diagram illustrating a circuit of an electrical load switching of FIG. 9.
Figure 11A:
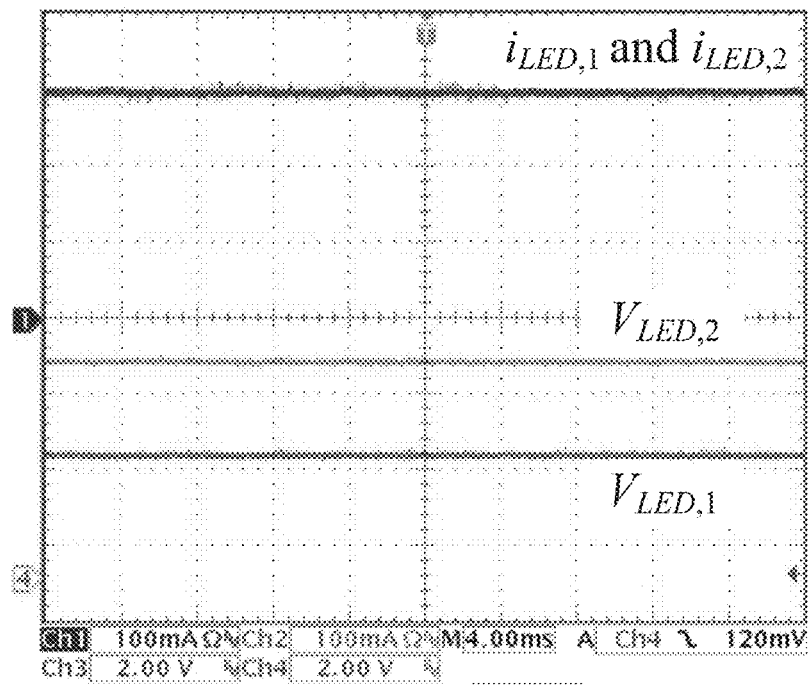
FIG. 11A is a current plot at stable LED load current of 300 mA in an experiment carried out with an electrical load driving apparatus in accordance with one embodiment of the present invention.
Figure 11B:
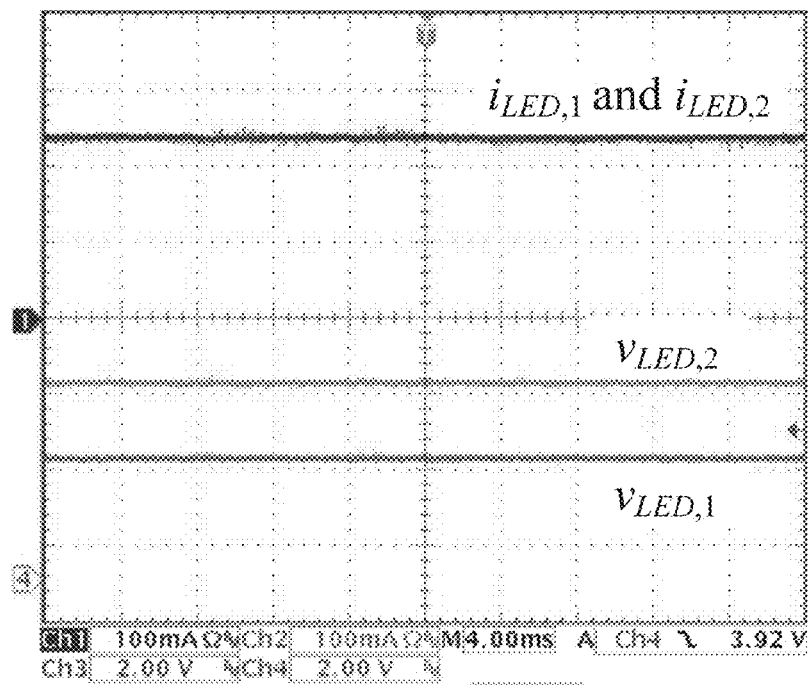
FIG. 11B is a current plot at stable LED load current of 240 mA in an experiment carried out with an electrical load driving apparatus in accordance with one embodiment of the present invention.
Figure 11C:
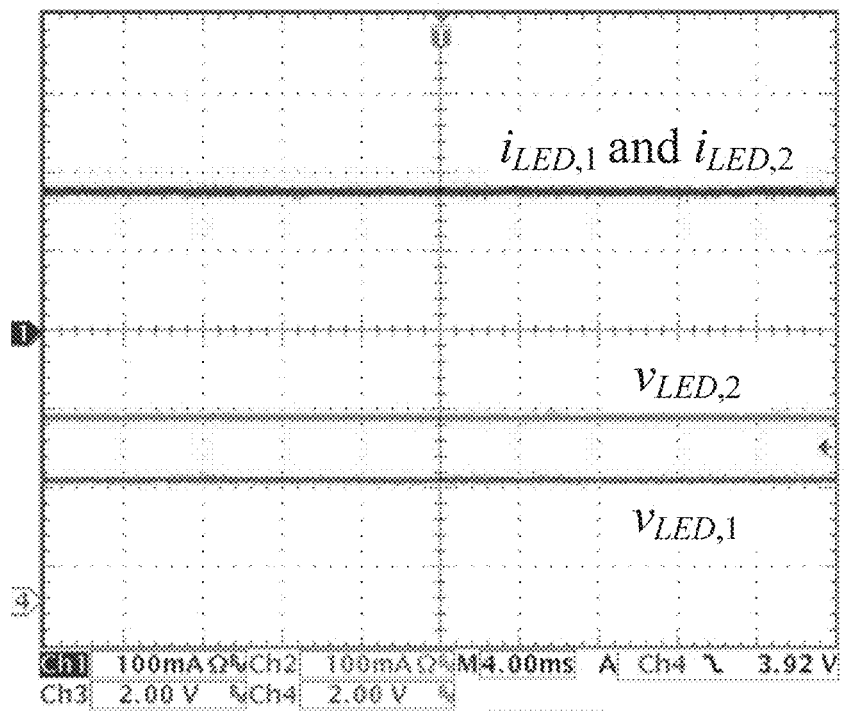
FIG. 11C is a current plot at stable LED load current of 180 mA in an experiment carried out with an electrical load driving apparatus in accordance with one embodiment of the present invention.
Figure 11D:
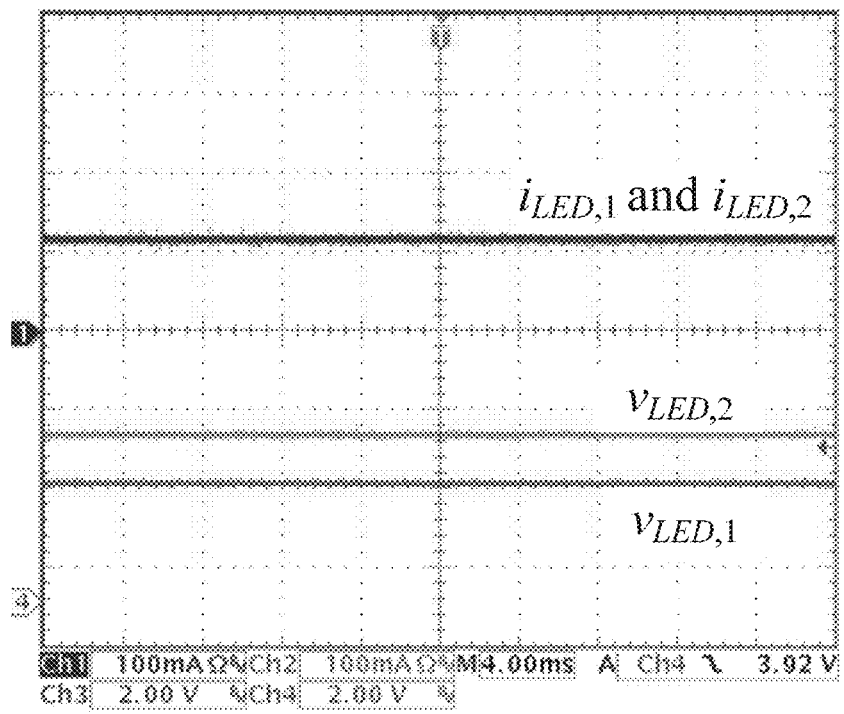
FIG. 11D is a current plot at stable LED load current of 120 mA in an experiment carried out with an electrical load driving apparatus in accordance with one embodiment of the present invention.

Referring to FIGS. 9 and 10, there is shown an electrical load switching apparatus 900, comprising a plurality of electrical loads 902 connected in series; and a plurality of switching circuits 904 connected in parallel with each of the plurality of the electrical loads, wherein the switching circuit are arranged to maintain a connection upon a disconnection of the associated electrical load.

Preferably, as shown in this embodiment, the electrical load is an LED and hence forms an LED string 906. In order to drive an LED string 906 at a stable operating point, the driver is typically a current source 914. Without exception, the equivalent driving source described in this embodiment for an LED string is also a current source. A faulty LED can be short circuit or open circuit. If an LED is short, the string can still be operated, except that the string voltage is smaller. However, any electrical load being disconnected or any LED in string open will cause the whole string off.

Preferably, the circuit that can maintain the driving current flowing through the healthy LEDs is based on connecting a switch circuit 904 across each LED. When an LED is open, the corresponding switch will be turned on so that the string current can be maintained through the switching circuit.

Preferably, the switching circuit is realized by a silicon controlled rectifier 908 (SCR), which is driven by the voltage across the corresponding LED. A capacitor 910 is also connected across the switch. When an LED is open, the driving current will be diverted to the capacitor across the faulty LED. Thus, the voltage across the faulty LED will increase because the capacitor will be charged by the driving current. Such voltage will trigger the SCR across the faulty LED through the corresponding resistive network 912. Then, after the SCR of the faulty LED is triggered, it provides a current path for driving current. The healthy LEDs can still be operated.

Figure 12A:
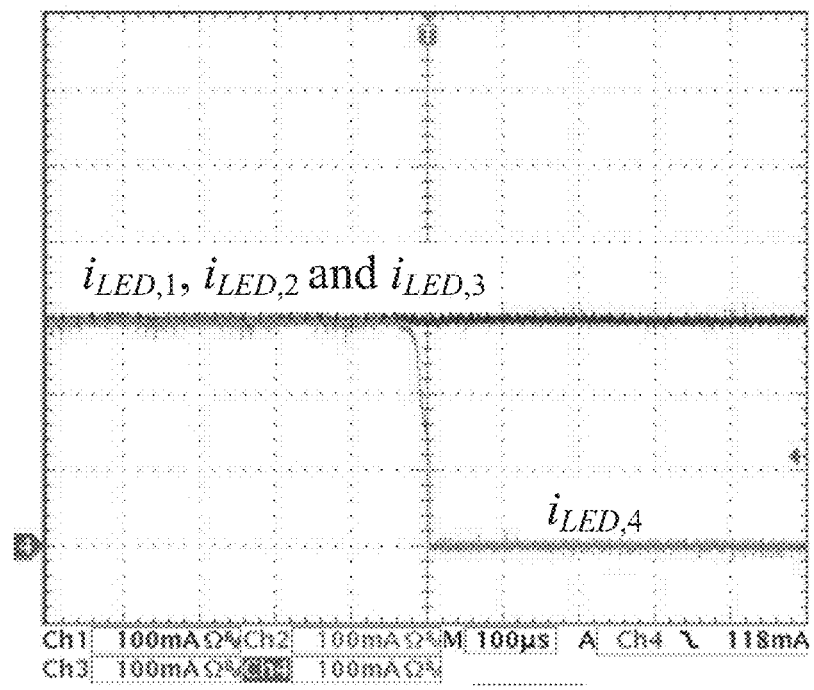
FIG. 12A is a current plot of an output load string of four LEDs connected in series, at stable LED load current, and one LED is in open circuit, in an experiment carried out with an electrical load driving apparatus in accordance with one embodiment of the present invention.
Figure 12B:
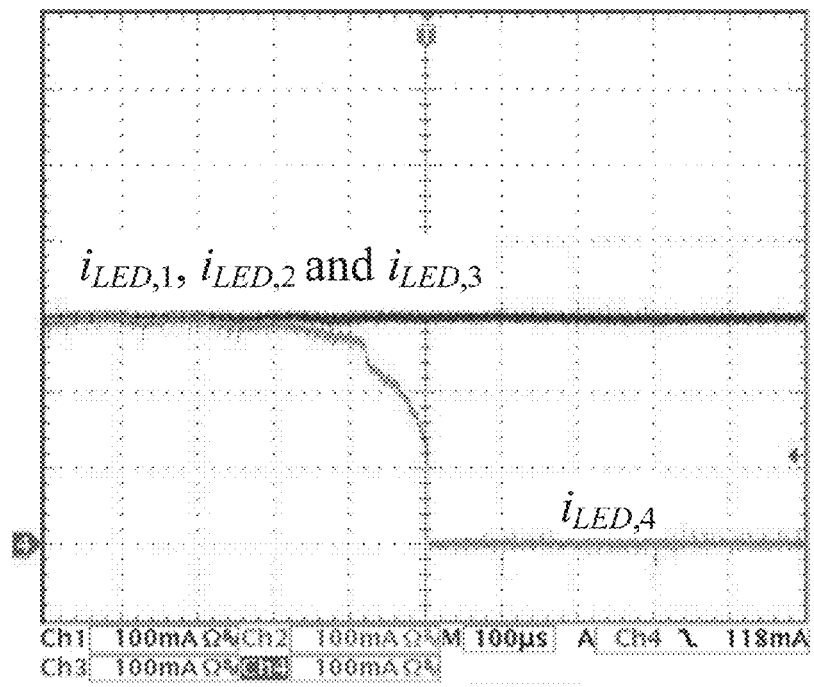
FIG. 12B is a current plot of an output load string of four LEDs connected in series, at stable LED load current, and one LED is in short circuit, in an experiment carried out with an electrical load driving apparatus in accordance with one embodiment of the present invention.

Experimental results were obtained with the apparatus according to one of the preferred embodiment. Seven modules in parallel have been built and tested. Their voltage and current are measured at different dimming levels, which are shown in FIG. 11A-11D. Table 1-4 presents the variation of voltage across the LED string and the variation of current flowing through the LED string at 100%, 80%, 60% and 40% of the rated power respectively. FIG. 12 shows the waveforms when one LED string fails, and Table 5 shows the variation of current flowing through the LED strings when one LED string, two LED strings, three LED strings, four LED strings and five LED strings fail at rated power. Results show that the string current has less than ±1% variation at different dimming levels, even if the string voltage has ±30% variation, and there is an abnormal condition in the LED string(s).

TABLE 1

Variation of $i_{LED}$ and $v_{LED}$ at 100% rated power

| Module | $i_{LED}$ (mA) | Variation of $i_{LED}$ (%) | $v_{LED}$ (V) | Variation of $v_{LED}$ (%) |
|---|---|---|---|---|
| M1 | 303 | 0.047 | 4.032 | −10.47 |
| M2 | 304 | 0.38 | 4.382 | −2.69 |
| M3 | 302 | −0.28 | 5.444 | 20.89 |
| M4 | 305 | 0.71 | 4.808 | 6.77 |
| M5 | 303 | 0.047 | 5.817 | 29.17 |
| M6 | 301 | −0.61 | 3.326 | −26.14 |
| M7 | 302 | −0.28 | 3.714 | −17.53 |

TABLE 2

Variation of $i_{LED}$ and $v_{LED}$ at 80% of rated power

| Module | $i_{LED}$ (mA) | Variation of $i_{LED}$ (%) | $v_{LED}$ (V) | Variation of $v_{LED}$ (%) |
|---|---|---|---|---|
| M1 | 243 | 0.29 | 3.789 | −8.81 |
| M2 | 245 | 0.53 | 4.107 | −1.15 |
| M3 | 246 | 0.94 | 4.916 | 18.32 |
| M4 | 243 | 0.29 | 4.425 | 6.50 |
| M5 | 244 | 0.12 | 5.335 | 28.40 |
| M6 | 243 | 0.29 | 3.219 | −22.52 |
| M7 | 242 | 0.70 | 3.293 | −20.74 |

TABLE 3

Variation of $i_{LED}$ and $v_{LED}$ at 60% rated power

| Module | $i_{LED}$ (mA) | Variation of $i_{LED}$ (%) | $v_{LED}$ (V) | Variation of $v_{LED}$ (%) |
|---|---|---|---|---|
| M1 | 182 | −0.47 | 3.556 | −7.40 |
| M2 | 184 | 0.63 | 3.802 | −0.99 |
| M3 | 183 | 0.08 | 4.403 | 14.66 |
| M4 | 182 | −0.47 | 4.048 | 5.42 |
| M5 | 183 | 0.08 | 4.736 | 23.33 |
| M6 | 184 | 0.63 | 3.138 | −18.28 |
| M7 | 182 | −0.47 | 3.197 | −16.74 |

TABLE 4

Variation of $i_{LED}$ and $v_{LED}$ at 40% of rated power

| Module | $i_{LED}$ (mA) | Variation of $i_{LED}$ (%) | $v_{LED}$ (V) | Variation of $v_{LED}$ (%) |
|---|---|---|---|---|
| M1 | 124 | −0.11 | 3.330 | −5.57 |
| M2 | 124 | −0.11 | 3.502 | −0.69 |
| M3 | 125 | 0.69 | 3.909 | 10.85 |
| M4 | 123 | −0.92 | 3.667 | 3.99 |
| M5 | 124 | −0.11 | 4.149 | 17.66 |
| M6 | 125 | 0.69 | 3.045 | 13.65 |
| M7 | 124 | −0.11 | 3.082 | 12.60 |

TABLE 5

Variation of $i_{LED}$ under faulty conditions in some LED string(s) at the rated power

| Module | Variation of $i_{LED}$ (%) (One LED fails) | Variation of $i_{LED}$ (%) (Two LEDs fail) | Variation of $i_{LED}$ (%) (Three LEDs fail) | Variation of $i_{LED}$ (%) (Four LEDs fail) | Variation of $i_{LED}$ (%) (Five LEDs fail) |
|---|---|---|---|---|---|
| M1 | −0.71% | −0.66% | −0.41% | −0.33% | −0.17% |
| M2 | 0.27% | 0.33% | X | X | X |
| M3 | 0.60% | 0.66% | −0.08% | 0% | X |
| M4 | −0.05% | 0% | X | X | X |
| M5 | 0.27% | X | 0.58% | 0.33% | 0.17% |
| M6 | −0.38% | −0.33% | X | X | X |
| M7 | X | X | −0.08% | X | X |

Note:
'X' means LED failure (open or short)

This invention realizes the current balance between LED strings. The variation of the LED voltage is around ±30%, while the variation of the LED current is less than ±1%. Any LED string(s) failure will not affect the other LED string(s) operating normally. The fault-tolerance of the system is improved a lot.

Advantageously, embodiments of the modules are scalable, and they share the same input switching network and energy recycling circuit. Thus, a module can be added or removed easily without requiring major circuit modification.

Advantageously, the current through each LED string is balanced even if there is a large variation in the LED string voltages. Additionally, the failure LED string(s) will not affect the normal operation of the other strings, and the failure of any LED will not affect the normal operation of the other LEDs within an LED string.

Without deviating from the spirit of the invention, the electrical load driving apparatus can be implemented to drive any electrical load, such as one or more motors, one or more incandescent or fluorescent lamp. In some embodiments, the electrical load driving apparatus can be implemented to drive one or more driving circuits, or any other electrical/electronic circuits.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrical load driving apparatus, comprising: a current distribution apparatus having a power source arranged to deliver an input current into a plurality of branches such that the input current is distributed into a plurality of individual branch currents, wherein:
   each of the plurality of branches includes a first coil arranged to form an inductive coupling with a second coil of an adjacent branch;
   the first coil and the second coil together define a transformer unit so that the plurality of transformer units are connected in a daisy-chained manner; and
   each of the plurality of branches is arranged to connect to an output load and to deliver the distributed individual branch current to the output load.

2. An electrical load driving apparatus in accordance with claim 1, wherein the inductive arrangement of each branch comprises a first coil and a second coil.

3. An electrical load driving apparatus in accordance with claim 2, wherein the first coil of each branch is inductively coupled with the second coil of an adjacent branch.

4. An electrical load driving apparatus in accordance with claim 3, wherein the first coil of each branch and the second coil of an adjacent branch together defines a transformer unit.

5. An electrical load driving apparatus in accordance with claim 4, wherein the number of transformer units equals the number of branches.

6. An electrical load driving apparatus in accordance with claim 4, wherein the transformer units are connected in a daisy-chained manner.

7. An electrical load driving apparatus in accordance with claim 4, wherein the first coils are primary coils of the transformer units and the second coils are secondary coils of the transformer units.

8. An electrical load driving apparatus in accordance with claim 7, wherein the primary coil and the secondary coil of each transformer unit are disposed in adjacent branches.

9. An electrical load driving apparatus in accordance with claim 7, wherein the primary coil of each transformer unit is disposed on the same branch with the secondary coil of an adjacent transformer unit.

10. An electrical load driving apparatus in accordance with claim 1 wherein a summation of the individual branch current of each of the plurality of individual branches is substantially equal to the input current.

11. An electrical load driving apparatus in accordance with claim 1, further comprising a plurality of isolation circuits operable to disconnect one or more of the associated output loads from one or more of the associated branches of the current distribution apparatus.

12. An electrical load driving apparatus in accordance with claim 11, wherein the isolation circuit is connected between the associated output load and the associated branch of the current distribution apparatus.

13. An electrical load driving apparatus in accordance with claim 11, further comprising a recycling circuit arranged to receive the individual branch current of the current distribution apparatus upon a disconnection of the associated output load from the associated branch of the current distribution apparatus.

14. An electrical load driving apparatus in accordance with claim 13, wherein the recycling circuit connects to at least one branch of the current distribution apparatus, and is in electrical communication with the power source.

15. An electrical load driving apparatus in accordance with claim 13, further comprising a plurality of diodes arranged to maintain an electrical connection between the recycling circuit with the associated branch upon a disconnection of the associated output load from the associated branch of the current distribution apparatus.

16. An electrical load driving apparatus in accordance with claim 15, wherein the diode forms a connection between the recycling circuit and the associated branch of the current distribution apparatus.

17. An electrical load driving apparatus in accordance with claim 1, further comprising a plurality of switching circuits connect between the power source and each of the associated branches of a plurality of input branches of the current distribution apparatus.

18. An electrical load driving apparatus in accordance with claim 17, wherein the switching circuit comprises a first diode arranged to prevent current from flowing between individual input branch of the current distribution apparatus to an another individual branch; and a second diode arranged to maintain a current flow when a zero voltage is applied to the switching circuit.

19. An electrical load driving apparatus in accordance with claim 1, further comprising a plurality of switching circuits connect between each of the associated output loads and each of the associated branches of the current distribution apparatus.

20. An electrical load driving apparatus in accordance with claim 19, wherein the switching circuit comprises a plurality of diodes connected as a full-bridge rectifier.

21. An electrical load driving apparatus in accordance with claim 1, wherein the power source is an alternating current source generated by connecting a direct current source to an input switching circuit.

22. An electrical load driving apparatus in accordance with claim 1, wherein the plurality of output loads is implemented with an electrical load switching apparatus, comprising: a plurality of electrical loads connect in series; a plurality of switching circuits connected in parallel with each of the plurality of electrical loads; wherein the switching circuits are arranged to maintain a connection upon a disconnection of the associated electrical load.

23. An electrical load driving apparatus in accordance with claim 1, wherein the plurality of output loads is a plurality of strings comprising a plurality of LEDs connected in series.

24. An electrical load driving apparatus in accordance with claim 1, wherein, whereupon one or more of the plurality of output loads is disconnected from each of the associated branches of the current distribution apparatus, the current distribution apparatus is arranged to absorb an electrical fluctuation caused by the disconnection within the electrical load driving apparatus.

25. An electrical load driving apparatus in accordance with claim 1, wherein the plurality of output loads is implemented with an electrical load switching apparatus comprising:

a plurality of electrical loads connected in series; and a plurality of switching circuits connected in parallel with each of the plurality of electrical loads;

wherein the switching circuits are arranged to maintain a connection upon a disconnection of the associated electrical load.

26. An electrical load driving apparatus in accordance with claim 25, wherein the switching circuits comprise a silicon controlled rectifier.

* * * * *